(12) United States Patent
Wu et al.

(10) Patent No.: US 8,254,116 B2
(45) Date of Patent: Aug. 28, 2012

(54) TILTING PORTABLE ELECTRONIC DEVICE

(75) Inventors: Kun-Tsan Wu, Shindian (TW);
Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 224 days.

(21) Appl. No.: 12/825,459

(22) Filed: Jun. 29, 2010

(65) Prior Publication Data

US 2011/0157784 A1   Jun. 30, 2011

(30) Foreign Application Priority Data

Dec. 31, 2009   (CN) .......................... 2009 1 0312970

(51) Int. Cl.
*H05K 5/00*     (2006.01)
*H05K 7/00*     (2006.01)
*H04M 1/00*    (2006.01)

(52) U.S. Cl. ......... 361/679.56; 361/679.09; 361/679.26; 361/679.27; 361/679.3; 455/575.4

(58) Field of Classification Search ............. 361/679.09, 361/679.26, 679.27, 679.3, 679.56; 455/575.4
See application file for complete search history.

(56) References Cited

U.S. PATENT DOCUMENTS

| 7,447,007 | B2* | 11/2008 | Jeun et al. ............... 361/679.55 |
| 7,583,496 | B2* | 9/2009 | Lai ............................. 361/679.3 |
| 7,690,576 | B2* | 4/2010 | Ladouceur et al. ........... 235/486 |
| 7,751,195 | B2* | 7/2010 | Barnett ...................... 361/727 |
| 7,925,310 | B2* | 4/2011 | Chiu .......................... 455/575.1 |
| 2007/0105606 | A1* | 5/2007 | Yoon et al. ................. 455/575.4 |

* cited by examiner

*Primary Examiner* — Anthony Haughton
(74) *Attorney, Agent, or Firm* — Altis Law Group, Inc.

(57) ABSTRACT

A tilting portable electronic device includes a housing, a cover, at least one rod, and at least one elastic member. The rod and the elastic member respectively rotatably connect the housing and the cover. When the cover is opened relative to the housing, the elastic member expands and causes the rod to rotate until the elastic member and the rod intercross to support an end of the cover in a slanted position relative to the housing.

16 Claims, 4 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| Application No. | Title | Inventors |
| --- | --- | --- |
| 12/825,459 | TILTING PORTABLE ELECTRONIC DEVICE | Kun-Tsan Wu et al. |
| 12/825,462 | TILTING PORTABLE ELECTRONIC DEVICE | Kun-Tsan Wu et al. |
| 12/825,471 | TILTING PORTABLE ELECTRONIC DEVICE | Kun-Tsan Wu et al. |
| 12/825,474 | TILTING PORTABLE ELECTRONIC DEVICE | Kun-Tsan Wu et al. |
| 12/825,477 | TILTING PORTABLE ELECTRONIC DEVICE | Kun-Tsan Wu et al. |
| 12/825,483 | TILTING PORTABLE ELECTRONIC DEVICE | Kun-Tsan Wu et al. |
| 12/825,484 | TILTING PORTABLE ELECTRONIC DEVICE | Kun-Tsan Wu et al. |
| 12/825,488 | TILTING PORTABLE ELECTRONIC DEVICE | Kun-Tsan Wu et al. |

BACKGROUND

1. Field of the Invention

The present invention relates to tilting portable electronic devices.

2. Description of Related Art

Conventional portable electronic device can be classified as bar-type devices, rotating-type devices and sliding-type devices. The bar-type device has a housing secured with a cover. The rotating-type device includes a housing and a cover rotatably attached to the housing about a single axis. The sliding-type device has a housing and a cover slidably attached to the housing.

However, sliding-type electronic devices have the following problems. When a user wants to watch a display of the electronic device resting on a table, it is desirable to have an additional support for supporting the electronic device in a slanted position to give the display a better viewing angle. Alternatively, the user may grip and slope the electronic device with his hands, however, it may become uncomfortable after a long time.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
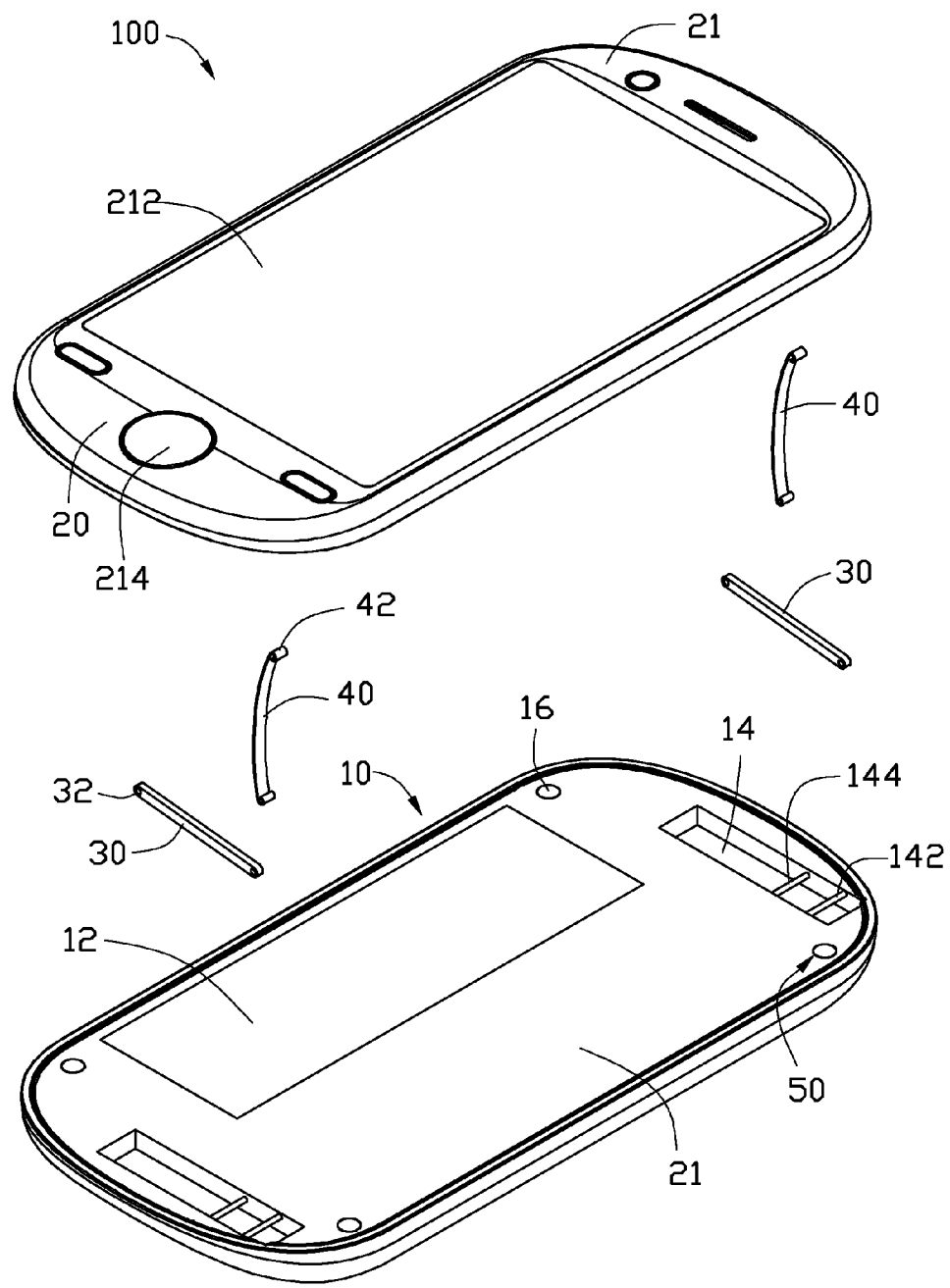
FIG. 1 is an exploded view of a tilting portable electronic device, according to an exemplary embodiment.

FIG. 1 shows a tilting portable electronic device 100, such as mobile phones, personal digital assistants (PDAs), digital cameras, including a housing 10, a cover 20, two rods 30, two elastic members 40 and several latching structures 50. The cover 20 is slidable relative to the housing 10, the two rods 30 are rotatably connected to the housing 10 and the cover 20. The elastic member 40 provides an elastic force to push the cover 20 to slide. The latching structure 50 latches the cover 20 with the housing 10.

The housing 10 has a top surface 11 including a keypad area 12 and two first receiving grooves 14 defined therein. The keypad area 12 is adjacent to an end of the top surface 11 and used for holding a keypad. The two first receiving grooves 14 are arranged adjacent to two sides of the top surface 11 and extends along the sliding direction of the cover 20. Each receiving groove 14 has a first connecting post 142 and a second connecting post 144 assembled therein. The first connecting post 142 and the second connecting post 144 extends perpendicularly to the sliding direction of the cover 20, and the both are adjacent to an end of the receiving groove 14. The first connecting post 142 is rotatably connected to one end of the rod 30 and the second connecting post 144 is rotatably connected to one end of the elastic member 40. Latching structure 50 may comprise first magnets 16 associated with, for example, formed on the top surface 11 near the four corners respectively. The magnets 16 are used to latch the cover 20 to the housing 10.

Figure 2:
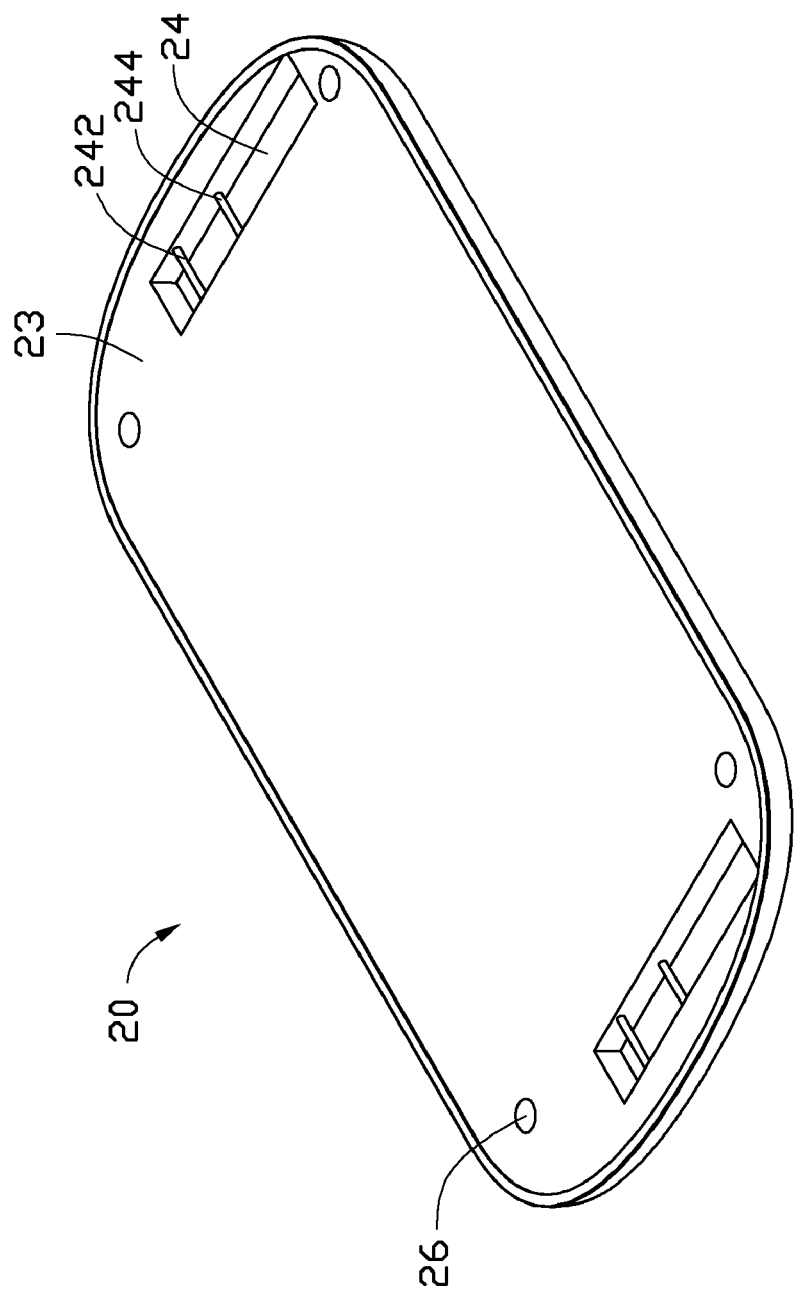
FIG. 2 is an isometric view of a cover of the electronic device shown in FIG. 1 from the upward view.

Referring further to FIG. 2, the cover 20 has an upper surface 21 and an opposite lower surface 23. The upper surface 21 has a display 212 and a plurality of buttons 214 arranged thereon. The lower surface 23 has two second receiving grooves 24 defined thereon, the two second receiving grooves 24 are arranged adjacent to two sides of the lower surface 23 and correspondingly engage with the two first receiving grooves 14. The second receiving groove 24 has a first shaft 242 and a second shaft 244 assembled therein, the first shaft 242 and the second shaft 244 are adjacent to one end of the second receiving groove 24. The first shaft 242 is rotatably connected to one end of the rod 30 and the second shaft 244 is rotatably connected to one end of the elastic member 40. Latching element 50 may also include second magnets 26 associated with, for example, formed near the corners of the cover 20. The four second magnets 26 correspond in position to and are for attracting to the four first magnets 16.

The rod 30 defines two connecting holes 32 at two ends for receiving the first connecting post 142 and the first shaft 242 respectively. The elastic member 40 can be a leaf spring, coiled spring, or torsion spring. A connecting portion 42 is formed at each end of the elastic member 40, the two connecting portions 42 are used to rotatably connect the second connecting post 144 and the second shaft 244 respectively.

The latching structure 50 is used to latch the cover 20 with the housing 10 when the cover 20 closed relative to the housing 10. As previously mentioned, in the present exemplary embodiment, the latching structure 50 includes the first magnets 16 and the second magnets 26. The cover 20 can be steadily latched or retained in its closed position relative to the housing 10 by the first magnets 16 being attracted to the second magnets 26.

Figure 3:
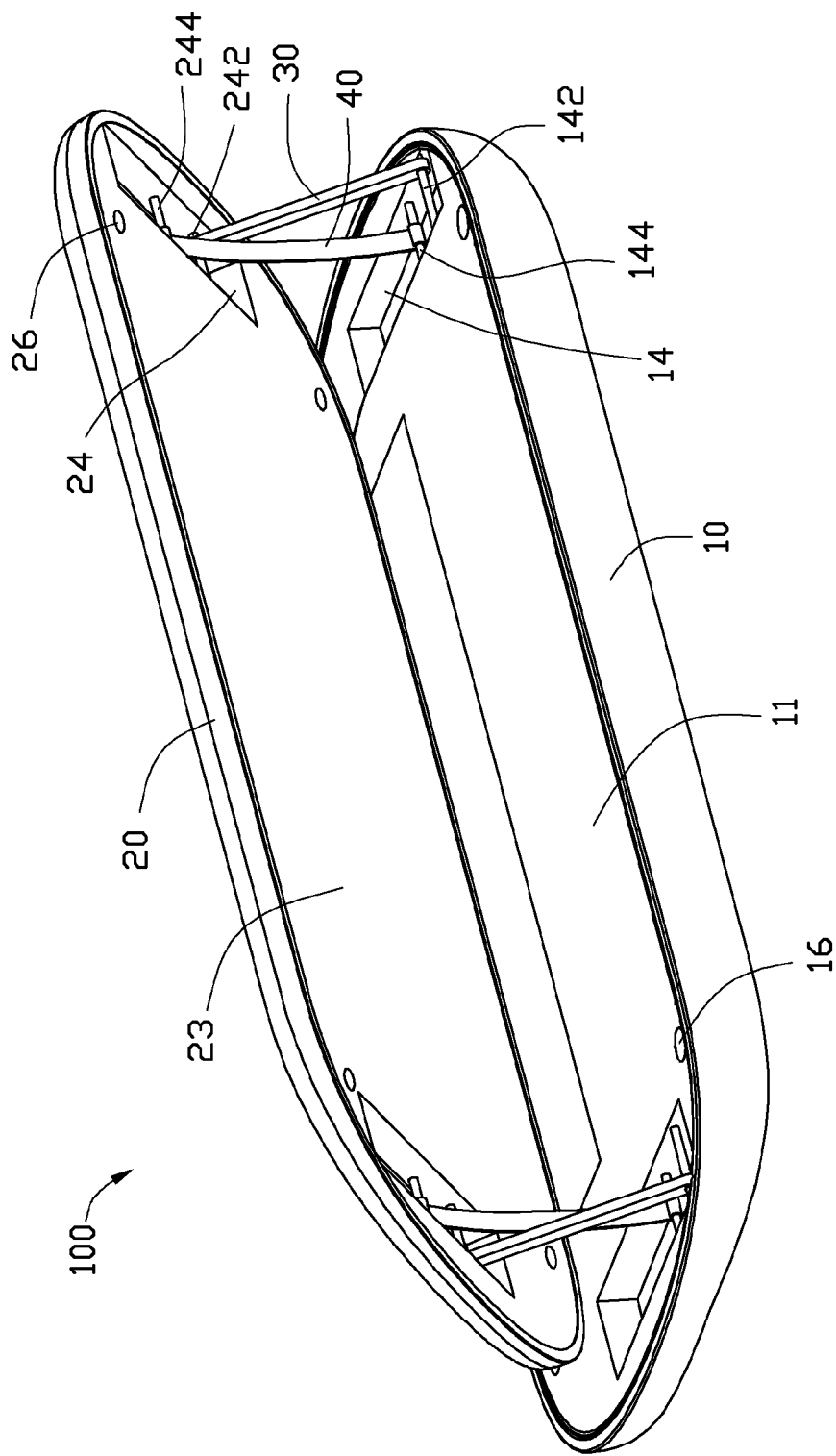
FIG. 3 is an assembled schematic view of the electronic device shown in FIG. 1 with the cover opened relative to a housing.

Referring to FIG. 3, to assemble the electronic device 100, the first receiving grooves 14 of the housing 10 are aligned with the second receiving grooves 24 of the cover 20. Each of the rods 30 is rotatably connected to the first connecting post 142 and the first shaft 242 respectively by the two connecting holes 32. Each of the elastic members 40 is rotatably connected to the second connecting post 144 and the second shaft 244 respectively by the two end portions 42. The elastic member 40 is in an expanded state and slanted relative to the top surface 11 in a predetermined angle, the rod 30 is slanted relative to the top surface 11 at another predetermined angle. The elastic member 40 and the rod 30 are intercrossed to support an end of the cover 20. The other end of the cover 20 abuts against the top surface 11 of the housing 10, so the cover 20 is slanted relative to the housing 10 and is in an open configuration.

Figure 4:
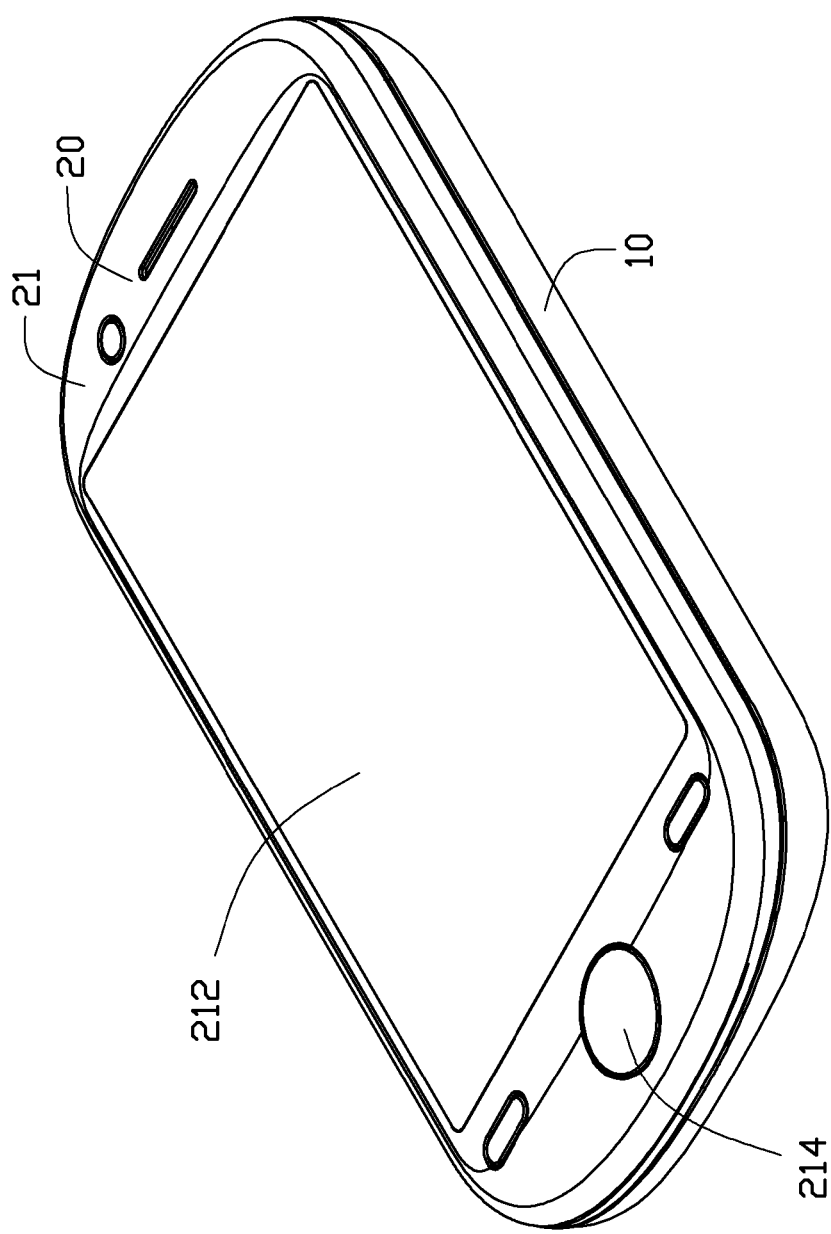
FIG. 4 is an assembled schematic view of the electronic device shown in FIG. 1 with the cover closed relative to the housing.

Referring to FIG. 4, to close the cover 20, the end not abutting on the top surface 11 of the cover 20 is pressed down, and the other end abutting the top surface 11 of the cover 20 slides correspondingly to cover the keypad area 12, until the cover 20 substantially abuts the top surface 11. The four second magnets 26 align with and attract with the four first magnets 16. The cover 20 is latched on the housing 10 and is closed relative to the housing 10. Then, the rod 30 and the elastic member 40 are received in an area defined by the first receiving groove 14 and the second receiving groove 24, with the elastic member 40 compressed and folded. When opening the cover 20, it is pushed to unlock the latching structure 50, then the elastic member 40 expands and rotates about the second connecting post 144 and the second shaft 244, causing the rods 30 to rotate about the first connecting post 142 and the first shaft 242. An end of the cover 20 slides along the top surface 11 and the other end of the cover 20 rotates to open, until the elastic members 40 are at the predetermined angle and can no longer rotate, and the cover 20 is in a slanted state relative to the housing 10.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A tilting portable electronic device, comprising:
a housing including at least one first connecting post and at least one second connecting post parallel to each other;
a cover including at least one first shaft and at least one second shaft parallel to each other;
at least one rod, a first end of the at least one rod rotatably connecting the first connecting post of the housing, and a second end of the at least one rod rotatably connecting the at least one first shaft of the cover;
at least one elastic member, a first end of the at least one elastic member rotatably connecting the second connecting post of the housing, and a second end of the at least one elastic member rotatably connecting the at least one second shaft of the cover; and
a latching structure for latching the cover and the housing, wherein:

when the cover is opened relative to the housing, the elastic member expands and causes the rod to rotate until the elastic member and the rod intercross to support an end of the cover in a slanted position relative to the housing; and when the cover is closed relative to the housing, the latching structure retains the portable electronic device in the closed position.

2. The tilting portable electronic device as claimed in claim 1, wherein the housing includes a top surface defining two first receiving grooves, the cover includes a lower surface defining two second receiving grooves; wherein the number of the at least one rod is two, the first end of each rod rotatably extends into each first receiving groove and the second end of each rod rotatably extends into each second receiving groove.

3. The tilting portable electronic device as claimed in claim 2, wherein the first receiving groove has the first connecting post assembled therein, the second receiving groove has the first shaft assembled therein, the rod defines a connecting hole at each end, the connecting holes of the rod rotatably and respectively connect to the first connecting post and the first shaft.

4. The tilting portable electronic device as claimed in claim 3, wherein the first receiving groove has the second connecting post assembled therein, the second receiving groove has the second shaft assembled therein, one end of the elastic member rotatably connects with the second connecting post and the other end of the elastic member rotatably connects with the second shaft.

5. The tilting portable electronic device as claimed in claim 4, wherein the first connecting post and the second connecting post are perpendicular with a sliding direction of the cover, the first shaft and the second shaft are perpendicular with a sliding direction of the cover.

6. The tilting portable electronic device as claimed in claim 1, wherein the elastic member is a leaf spring, the first end and the second ends of the elastic member are bent to a barrel for containing the second connecting post and the second shaft.

7. The tilting portable electronic device as claimed in claim 1, wherein the latching structure includes first magnets associated with the housing and second magnets associated with the cover, the second magnets attract the first magnets to retain the cover in the closed position.

8. The tilting portable electronic device as claimed in claim 2, wherein the top surface defines a keypad area, the cover has an upper surface having a display, and when the cover opens, the display slants relative to the keypad area.

9. A tilting portable electronic device, comprising:
a housing including at least one first connecting post and at least one second connecting post parallel to each other;
a cover including at least one first shaft and at least one second shaft parallel to each other;
at least one rod, a first end of the at least one rod rotatably connecting the first connecting post of the housing, and a second end of the at least one rod rotatably connecting the at least one first shaft of the cover; and
at least one elastic member, a first end of the at least one elastic member rotatably connecting the second connecting post of the housing, and a second end of the at least one elastic member rotatably connecting the at least one second shaft of the cover;
wherein when the cover is opened relative to the housing, the elastic member expands and the rod rotates until the elastic member and the rod intercross to support an end of the cover in a slanted position relative to the housing.

10. The tilting portable electronic device as claimed in claim 9, wherein the housing includes a top surface defining two first receiving grooves, the cover includes a lower surface defining two second receiving grooves; wherein one end of each rod rotatably extends into each first receiving groove and the other end of each rod rotatably extends into each second receiving groove.

11. The tilting portable electronic device as claimed in claim 10, wherein the first receiving groove has the first connecting post assembled therein, the second receiving groove has the first shaft assembled therein, the rod defines a connecting hole at each end, the connecting holes of the rod rotatably and respectively connect to the first connecting post and the first shaft.

12. The tilting portable electronic device as claimed in claim 11, wherein the first receiving groove has the second connecting post assembled therein, the second receiving groove has the second shaft assembled therein, the first end and the second ends of the elastic member are bent to a barrel for containing the second connecting post and the second shaft.

13. The tilting portable electronic device as claimed in claim 9, wherein the elastic member is a leaf spring, the first end and the second ends of the elastic member are bent to a barrel for containing the second connecting post and the second shaft.

14. The tilting portable electronic device as claimed in claim 9, wherein the tilting portable electronic device further includes a latching structure to latch the cover with the housing.

15. The tilting portable electronic device as claimed in claim 14, wherein the latching structure includes first magnets associated with the housing and second magnets associated with the cover, the second magnets may attract the first magnets correspondingly to retain the cover in the closed position.

16. A tilting portable electronic device, comprising:
a housing defining a first receiving groove including a first connecting post and a second connecting post parallel to each other, the first connecting post and the second connecting post adjacent to one end of the first receiving groove;
a cover defining a second receiving groove including a first shaft and a second shaft parallel to each other, the first shaft and the second shaft adjacent to one end of the second receiving groove;
a rod, a first end of the rod rotatably connecting the first connecting post of the housing, and a second end of the rod rotatably connecting the first shaft of the cover;
an elastic member, a first end of the elastic member rotatably connecting the second connecting post of the housing, and a second end of the elastic member rotatably connecting the second shaft of the cover; and
a latching structure for latching the cover and the housing, wherein:
when the cover is opened relative to the housing, the elastic member expands and causes the rod to rotate until the elastic member and the rod intercross to support an end of the cover in a slanted position relative to the housing; and
when the cover is closed relative to the housing, the latching structure retains the portable electronic device in the closed position.

\* \* \* \* \*